No. 763,325. Patented June 21, 1904.

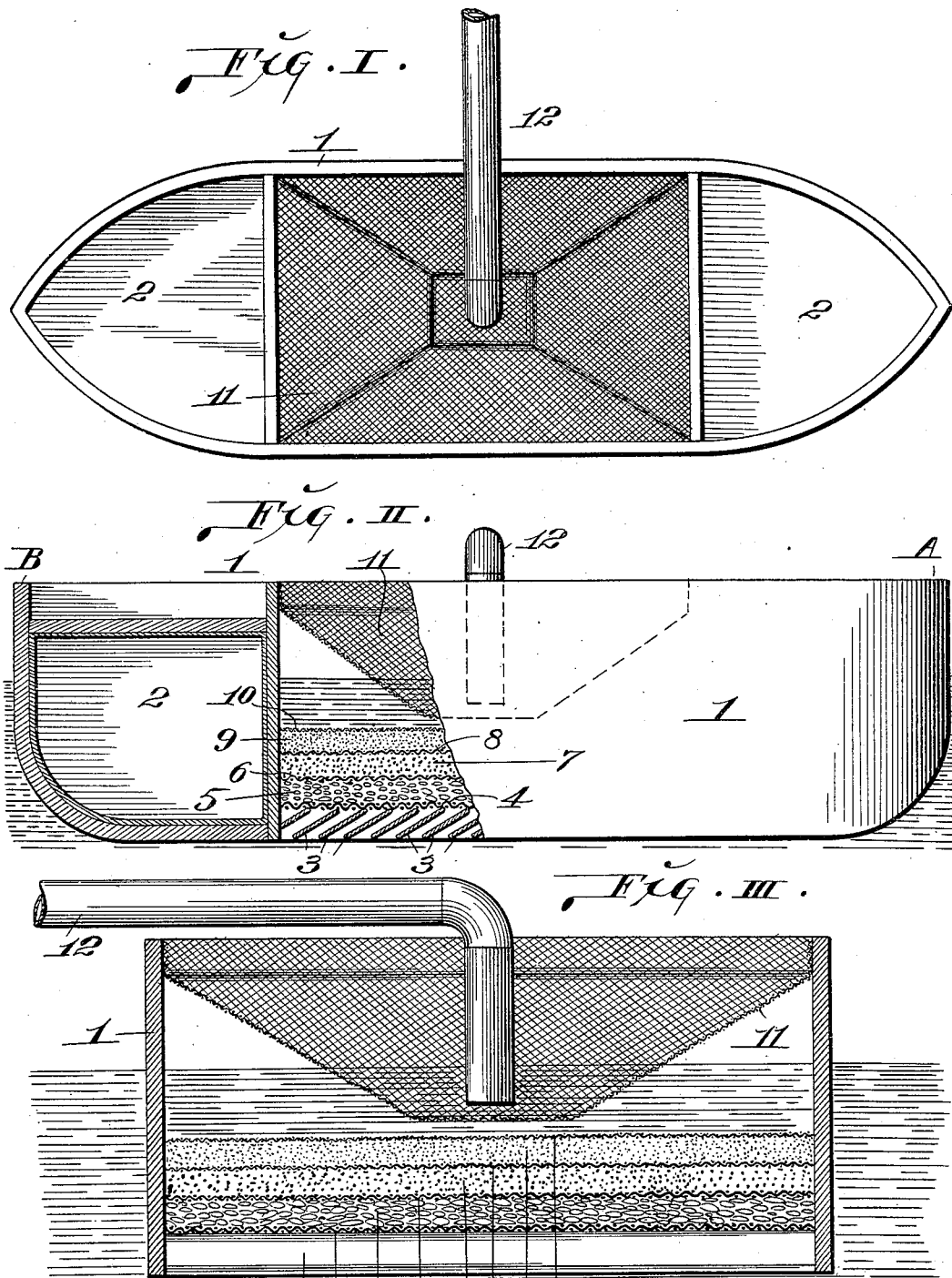

UNITED STATES PATENT OFFICE.

JOHN ROCHE, OF MONETT, MISSOURI, ASSIGNOR OF THREE-FIFTHS TO GEORGE A. HANCOCK, OF SPRINGFIELD, MISSOURI, AND ERNEST L. THESIERES, OF ST. LOUIS, MISSOURI.

FLOATING WATER-FILTER.

SPECIFICATION forming part of Letters Patent No. 763,325, dated June 21, 1904.

Application filed September 4, 1903. Serial No. 171,901. (No model.)

*To all whom it may concern:*

Be it known that I, JOHN ROCHE, a citizen of the United States, residing in Monett, in the county of Barry, State of Missouri, have invented certain new and useful Improvements in Floating Water-Filters, of which the following is a full, clear, and exact description, reference being had to the accompanying drawings, forming part of this specification.

My invention relates to a water-filter designed to be floated in a river or other body of water and through which water from the surrounding body constantly enters the filter and is purified to be drawn off for use.

The invention consists in features of novelty hereinafter fully described, and pointed out in the claim.

Figure I is a top or plan view of my filter. Fig. II is a view of the filter, partly in longitudinal section and partly in side elevation. Fig. III is a transverse section of the filter.

1 designates a floating vessel which may be in the form of a barge, scow, or any other shape. In each end of the vessel 1 is an airtight chamber 2, (see Fig. II,) through the medium of which buoyancy for the vessel is secured. The central part of the vessel is apertured from top to bottom, and in such aperture is placed the filtering medium through which the water passes for purification.

A indicates the head end of the vessel 1, which when the vessel is positioned in running water is pointed upstream, and B indicates the tail end of the vessel, which is pointed downstream when the vessel is in a running stream. In the vessel, at the bottom of the vertical aperture therein, are a plurality of slats 3, which are inclined downwardly and backwardly from the head end of the vessel toward the tail end thereof. These slats are positioned as stated in order that any large objects floating in the water will pass the slats and flow on with the current in the stream instead of entering between the slats to clog the spaces between them. Above the slats 3 is a perforated screen 4, that is surmounted by a bed 5 of coarse gravel. Above the bed of coarse gravel is a second perforated screen 6, that is surmounted by a bed 7 of fine gravel, which in turn is surmounted by a screen 8. This screen 8 supports a bed 9 of fine sand, which is surmounted by a screen 10. The screens 4, 6, 8, and 10 are of increasing fineness of mesh in the order named, so that the coarser screens at the bottom of the filtering medium confine the coarser grade of gravel between them. The topmost screens of mesh confine the sand between them and the central screens confine the finer gravel. In the upper end of the vertical aperture in which the filtering medium is arranged is a screen 11 of hopper shape, that is secured to the walls of the aperture and inclines inwardly to the vertical center of the aperture. This hopper-shape screen serves to protect the top of the filtering medium by forming a covering therefor.

12 is a suction-pipe that leads into the hopper-screen 11 and is open to communication with the interior of the vertical aperture in the vessel 1 to receive the water that passes upwardly in said aperture in a purified state after percolating through the filtering medium.

By a filter constructed in accordance with my invention and floated in a body of water where it is secured by any suitable means, such as an anchor or stays, I am enabled to secure a constant supply of fresh purified water, which is taken from the upper surface of the body of water that always contains the least amount of impurities and is therefore the most readily purified. The filter may be made of any desirable size to suit requirement of supply of filtered water demanded.

I claim as my invention—

A floating filter consisting of a vessel having a vertical aperture therein, a filtering medium located in said aperture, and a plurality of inclined slats located beneath said filtering medium.

JOHN ROCHE.

In presence of—
E. S. KNIGHT,
BLANCHE HOGAN.